June 24, 1969 J. A. VALLEE 3,452,348

CONVERSION FROM SELF-CLOCKING CODE TO NRZ CODE

Filed June 29, 1965 Sheet 1 of 2

INVENTOR.
JOHN A. VALLEE
BY Carl V. Olson
Attorney

INVENTOR.
JOHN A. VALLEE
BY
Carl V. Olson
Attorney

United States Patent Office 3,452,348

Patented June 24, 1969

3,452,348

CONVERSION FROM SELF-CLOCKING CODE TO NRZ CODE

John A. Vallee, Juno Beach, Fla., assignor to Radio Corporation of America, a corporation of Delaware Filed June 29, 1965, Ser. No. 467,932

Int. Cl. H04l 3/00; H03k 13/24

U.S. Cl. 340—347 6 Claims

ABSTRACT OF THE DISCLOSURE

Input signal (read from a magnetic medium) is a self-clocking signal in which a transition occurs in the middle of a bit cell representing a "1" and a transition occurs between two successive bit cells representing "0's." A timing extraction circuit generates a first timing wave having a pulse during the first half of each bit cell, and a second timing wave having a pulse during the second half of each bit cell. The timing waves are used to effect a comparison of the first and second halves of each input signal bit cell. If different, output NRZ coded bit is a "1," and if they are the same, output NRZ coded bit is a "0." NRZ output signal is suitable for application to a shift register.

Figure 1:
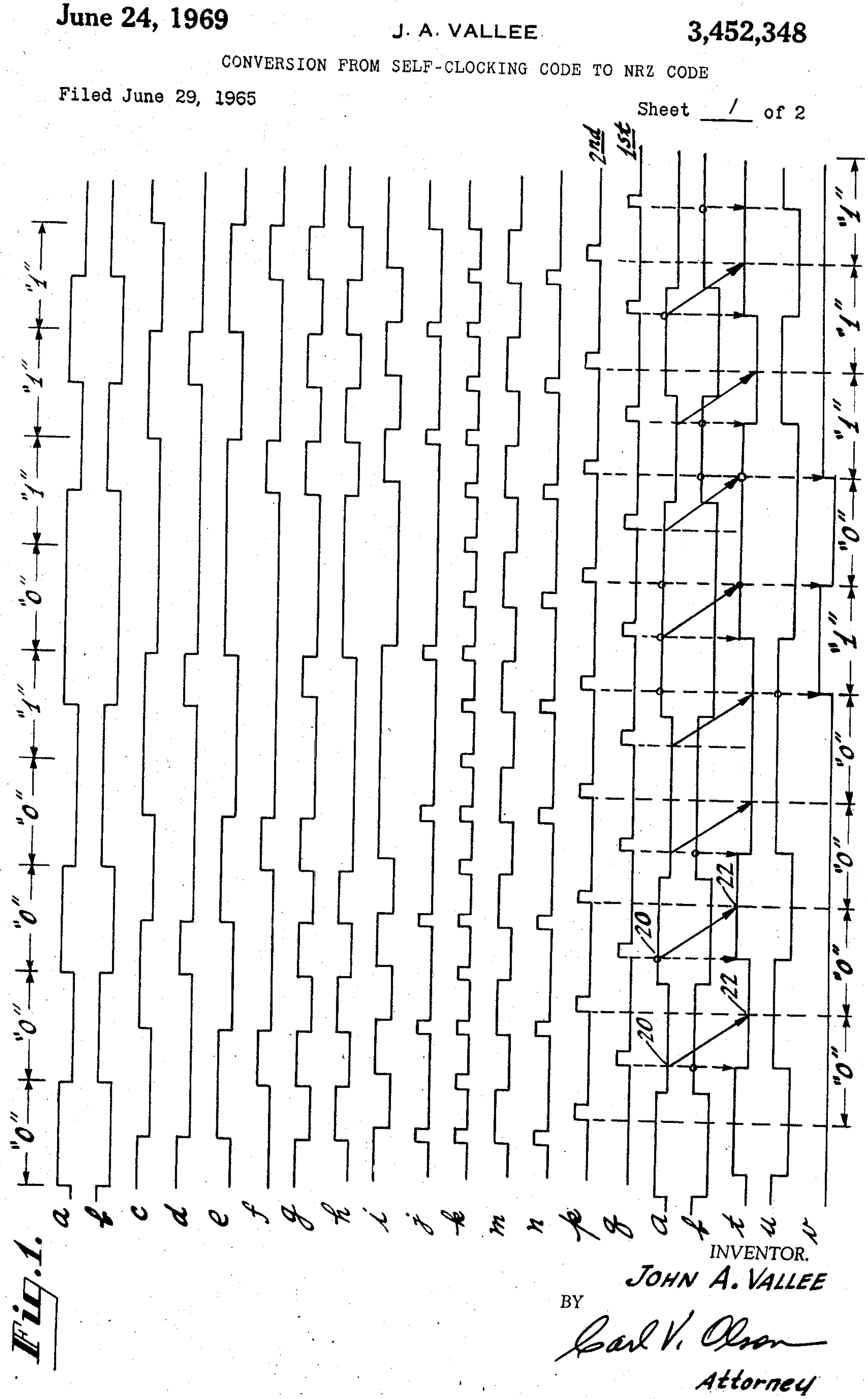

This invention relates to digital information code converters, and has for its object the provision of an improved converter for translating a self-clocking input information signal, in which a transition occurs in the middle of a bit cell representing a "1" and a transition occurs between bit cells representing two successive "0's" to a simple non-return-to-zero (NRZ) output signal containing the same digital information.

While not limited thereto, the invention is particularly useful in magnetic recording and reproducing systems which employ the above-described self-clocking signal for the recording of information on a magnetic medium with a relatively high packing density. After the self-clocking high-density information signal is read from the magnetic medium, the converter of the invention is useful for converting the reproducude signal to a simple NRZ signal and a clock pulse wave suitable for application to the respective signal and shift inputs of a conventional shift register.

In accordance with an example of the invention there is provided a code converter receptive to a self-clocking input information signal in which a transition occurs in the middle of a bit cell representing a "1" and a transition occurs between bit cells representing two successive "0's." Timing pulse waves are generated under synchronizing control of the input signal. A first timing wave has a pulse occurring during the first half of each input bit cell, and a second timing wave has a pulse occurring during the second half of each input bit cell. A first gate means is enabled by pulses of the first timing wave and the input signal to set and reset a first flip-flop and thereby produce a delayed input signal. A second gate means is enabled by pulses of the second timing wave to set a second flip-flop when the input signal and delayed input signal are different (indicating a "1" transition), and to reset the flip-flop when the input signal and delayed input signal are the same (indicating a "0" bit). The output of the second flip-flop is a simple non-return-to-zero signal containing the information of the input signal.

Figure 2:
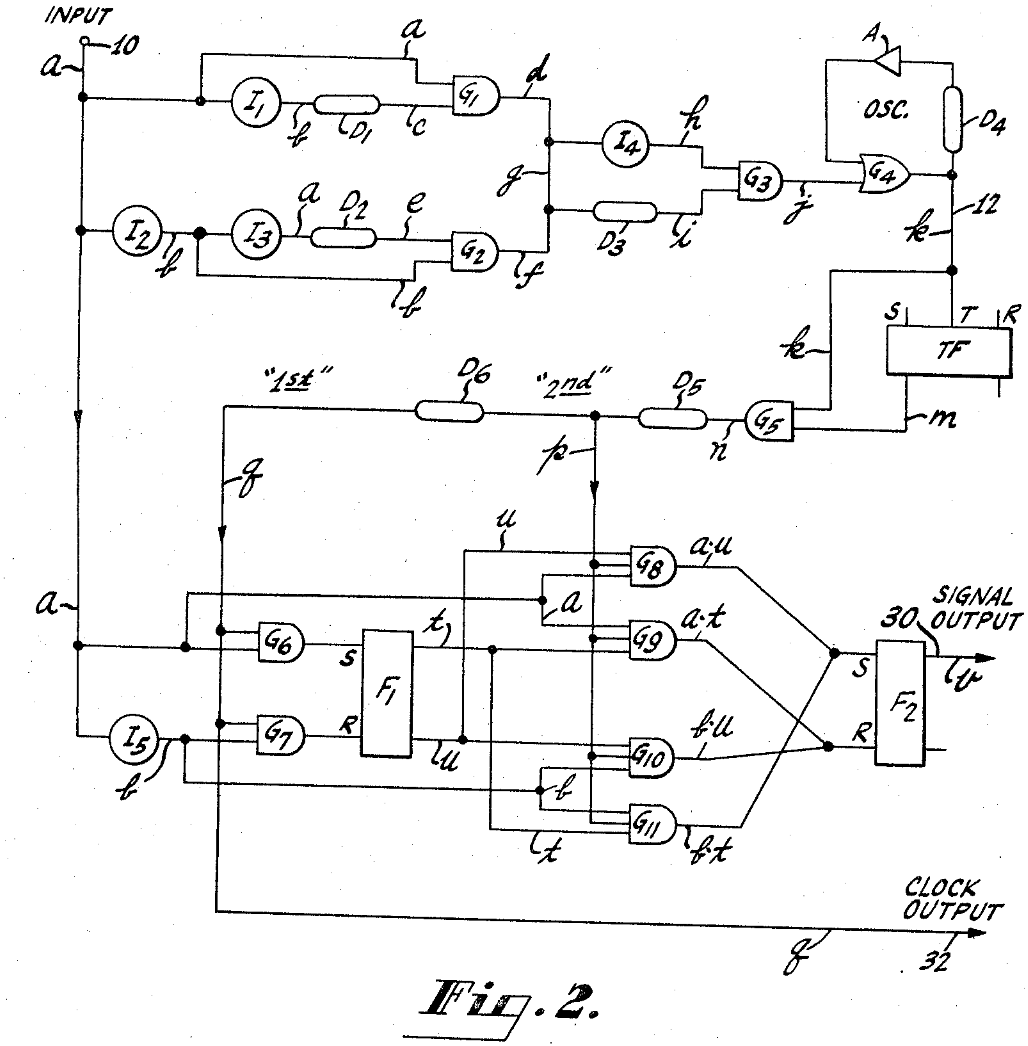

In the drawing:

FIG. 1 is a chart of voltage waveforms showing an input information signal in a self-clocking high-density code, intermediate voltage waveforms, and an output information signal in the simple NRZ code; and FIG. 2 is a diagram of a code converter constructed according to the teachings of the invention to provide the code conversion illustrated by waveforms in FIG. 1.

Referring now in greater detail to the drawing, FIG. 1*a* shows the waveform of a self-clocking high density input information signal in which a transition occurs in the middle of a bit cell representing a "1" and a transition occurs between bit cells representing two successive "0's." The input information signal of FIG. 1*a* conveys the illustrative binary information 000010111. The first four "0's" are illustrative of an all "0's" preamble for a message beginning with the information 10111. An all "0's" preamble is employed to insure correct phasing of the timing pulse waves extracted from the input signal. FIG. 1*v* shows the output signal in the simple NRZ code suitable for application to the signal input of a conventional shift register. FIG. 1*q* shows a clock output wave suitable for application to the shift input of the shift register.

Reference is now made to the upper portion of FIG. 2 for a description of the portion of the converter which extracts timing pulse waves from the input signal. The signal input terminal 10 in FIG. 2 receives the input signal wave shown in FIG. 1*a*. Inverter $I_1$ produces an inverted input signal shown in FIG. 1*b*. A delay unit $D_1$ produces an inverted and delayed input signal as shown in FIG. 1*c*. A gate $G_1$ receives the input signal of FIG. 1*a* and the inverted and delayed input signal of FIG. 1*c* and produces at its output a wave as shown in FIG. 1*d*. Gate $G_1$, and all other similarly represented gates to be described, are conventional "and" gates. Other types of gates may, of course, be employed provided that appropriate attention is given to the polarities of the signals involved and the basic functions performed by the gates.

Inverter $I_2$ inverts the input signal of FIG. 1*a* to produce the inverter signal of FIG. 1*b*. An inverter $I_3$ reinverts the input signal, and a delay unit $D_2$ produces a delayed input as shown in FIG. 1*e*. The waves of FIGS. 1*e* and 1*b* are applied to a gate $G_2$ to provide an output wave as shown in FIG. 1*f*. The waves of FIGS. 1*d* and 1*f* are combined to result in the wave shown in FIG. 1*g*.

The wave of FIG. 1*g* is inverted by an inverter $I_4$ to produce a wave shown in FIG. 1*h*, and is delayed in a delay unit $D_3$ to produce a wave as shown in FIG. 1*i*. These two waves applied to a gate $G_3$ result in a wave, shown in FIG. 1*j*, which includes a pulse following each transition in the input signal of FIG. 1*a*. The wave of FIG. 1*j* is applied to the synchronizing input of an oscillator including an "or" gate $G_4$, a delay unit $D_4$ and an amplifier A. The output of amplifier A is coupled back to a feedback input of "or" gate $G_4$.

Every pulse of the wave of FIG. 1*j* applied to "or" gate $G_4$ appears at output line 12 of the oscillator. Also, every pulse at output 12 is delayed in delay unit $D_4$, amplified in amplifier A and passed through "or" gate $G_4$ to appear again on output line 12. Once started, the oscillator continuously produces an output wave (FIG. 1*k*) having a period equal to one-half the duration of a bit cell of the input signal. The doubled frequency of the oscillator output insures that every pulse applied from gate $G_3$ to the oscillator acts as a synchronizing pulse to control the frequency of the oscillator.

The output 12 of the oscillator is coupled to the trigger input T of a triggerable flip-flop TF and is coupled to an input of a gate $G_5$. Flip-flop TF has a reset input R to which a reset pulse is applied prior to initiation of the message preamble for the purpose of insuring a correct phase of the flip-flop TF in response to oscillator pulses applied to its trigger input T. An output of flip-flop TF as shown in FIG. 1*m* has a frequency equal to one-half of the oscillator frequency. The half frequency output of the flip-flop TF is coupled to gate $G_5$ to pass every other one of the oscillator pulses to provide a wave as shown in FIG. 1*n*. The output of gate $G_5$ is delayed in delay unit $D_5$ to provide a "second" timing pulse wave shown in FIG. 1*p*, and is further delayed in a delay unit $D_6$ to provide a "first" timing pulse wave shown in FIG. 1*q*.

Reference is now made to the lower portion of FIG. 2 for a description of the portion of the converter which converts the input information signal to an output information signal. The signal input terminal 10 is connected to an input of a gate $G_6$, and is connected through an inverter $I_5$ to an input of a gate $G_7$. These inputs to gates $G_6$ and $G_7$ are input and inverted input signal waves as shown in FIGS. 1*a* and 1*b*, respectively. These waves are repeated in the drawing following FIG. 1*q* for convenience in illustrating their effects on gates $G_6$ and $G_7$. Gates $G_6$ and $G_7$ also receive the first timing wave shown in FIG. 1*q*.

The output of gate $G_6$ is coupled to the set input S of a flip-flop $F_1$, and the output of gate $G_7$ is coupled to the reset input R of the flip-flop $F_1$. The corresponding outputs *t* and *u* from flip-flop $F_1$ are shown in FIGS. 1*t* and 1*u*, respectively. The outputs of flip-flop $F_1$ are delayed versions of the input and inverted input signals of FIGS. 1*a* and 1*b*. The amount of delay is equal to approximately half the duration of a bit cell of the input signal. The condition of the input signal of FIG. 1*a* at the time 20 of a pulse in the first timing wave of FIG. 1*q* is remembered in the flip-flop $F_1$ and is the same as the condition of the delayed input wave of FIG. 1*t* at the time 22 of the next following pulse of the second timing wave of FIG. 1*p*.

Gates $G_8$, $G_9$, $G_{10}$ and $G_{11}$ are all connected to be enabled by pulses of the second timing wave of FIG. 1*p*. Gate $G_8$ is also connected to be enabled by the delayed, inverted input signal *u* from flip-flop $F_1$ and the input information signal *a* from input terminal 10. Gate $G_9$ is also connected to be enabled by the input information signal *a* and the delayed input information signal *t* from flip-flop $F_1$. Gate $G_{10}$ is also connected to be enabled by the delayed and inverted input signal *u* from flip-flop $F_1$ and the inverted input information signal *b* from inverted $I_5$. Gate $G_{11}$ is also enabled by an inverted input information signal *b* and a delayed input information signal *t* from flip-flop $F_1$.

The outputs of gates $G_8$ and $G_{11}$ are connected to the set input S of a second flip-flop $F_2$. The outputs of gates $G_9$ and $G_{10}$ are connected to the reset input R of flip-flop $F_2$. An output 30 from the flip-flop $F_2$ provides a simple non-return-to-zero signal, as shown in FIG. 1*v*, containing the information conveyed by the input information signal of FIG. 1*a*.

The second flip-flop $F_2$ is reset by an output from gate $G_9$ or $G_{10}$ at the time of a second timing wave pulse (FIG. 1*p*) if the input signal (FIGS. 1*a* and 1*b*) is then the same as the delayed input signal (FIGS. 1*t* and 1*u*). Of course, if the second flip-flop $F_2$ was previously reset, an additional resetting input has no effect on the output of the flip-flop. The second flip-flop $F_2$ is set from gates $G_8$ or $G_{11}$ at the time of a pulse of the second timing wave (FIG. 1*q*) if the input signal (FIGS. 1*a* and 1*b*) is then different from the conditions of the delayed input signal (FIGS. 1*t* and 1*u*). The result of the comparison of the input signal and the delayed input signal is to determine whether the input signal included a transition between the first and second halves of each input signal bit cell. If there is no difference between the input signal and the delayed input signal, the bit cell contained a "0" which is represented by a low output *v* at terminal 30 of the second flip-flop $F_2$. If there is a difference between the input signal and the delayed input signal, there was a transition in the input signal between the first and second halves of the input signal bit cell. Such a transition indicates a "1," which is represented by a high output *v* at terminal 30 of the second flip-flop.

The output 30 from the second flip-flop $F_2$ is a simple non-return-to-zero signal suitable for application to the signal input of a conventional shift register. The "first" timing wave (FIG. 1*g*) produced at the output of delay unit $D_6$ is conveyed to clock output terminal 32 for application to the shift input of the shift register.

What is claimed is:

1. A code converter utilizing a self-clocking input information signal in which a transition occurs in the middle of a bit cell representing a "1" and a transition occurs between bit cells representing two successive "0's," comprising means to compare the first and second halves of each input signal bit cell and to provide a "same" output when they are the same, and a "different" output when they are different, and a flip-flop having one input coupled to receive said "same" output and having another input coupled to receive said "different" output, whereby the output of said flip-flop is a simple non-return-to-zero signal containing the information of said input signal.

2. A code converter utilizing a self-clocking input information signal in which a transition occurs in the middle of a bit cell representing a "1" and a transition occurs between bit cells representing two successive "0's," comprising means to translate said input signal to a delayed input signal delayed about one-half of a bit cell period relative to the input signal, means to compare the second half of each input signal bit cell with the delayed input signal then representing the first half of the respective input signal bit cell and to provide a "same" output when they are the same, and a "different" output when they are different, and a flip-flop having a reset input coupled to receive said "same" output and having a set input coupled to receive said "different" output, whereby the output of said flip-flop is a simple non-return-to-zero signal containing the information of said input signal.

3. A code converter utilizing a self-clocking input information signal in which a transition occurs in the middle of a bit cell representing a "1" and a transition occurs between bit cells representing two successive "0's," comprising means to extract from said input signal a timing wave having a pulse occurring during the second half of each input bit cell, means to translate said input signal to a delayed input signal delayed about one-half of a bit cell period relative to the input signal, means enabled by pulses of said timing wave to compare the second half of each input signal bit cell with the delayed input signal then representing the first half of the respective input signal bit cell and to provide a "same" output when they are the same, and a "different" output when they are different, and a flip-flop having one input coupled to receive said "same" output and having another input coupled to receive said "different" output, whereby the output of said flip-flop is a simple non-return-to-zero signal containing the information of said input signal.

4. A code converter utilizing a self-clocking input information signal in which a transition occurs in the middle of a bit cell representing a "1" and a transition occurs between bit cells representing two successive "0's," comprising means to extract from said input signal a first timing wave having pulses occurring during the first half of each input bit cell, and a second timing wave having pulses occurring during the second half of each input bit cell, a first flip-flop, first gate means enabled by pulses of said first timing wave and said input signal to set and reset said first flip-flop and thereby produce a delayed input signal, a second flip-flop, and second gate means enabled by pulses of said second timing wave to set said second flip-flop when said input signal and delayed input signal are different, and to reset said second flip-flop when said input signal and delayed input signal are the same, whereby the output of said second flip-flop is a simple non-return-to-zero signal containing the information of said input signal.

5. A code converter utilizing a self-clocking input information signal in which a transition occurs in the middle of a bit cell representing a "1" and a transition occurs between bit cells representing two successive "0's," comprising means including an oscillator synchronized by said input signal to generate a first timing wave having pulses occurring during the first half of each input bit cell, and a second timing wave having pulses occurring during the second half of each input bit cell, a first flip-flop, first gate means enabled by pulses of said first timing wave and said input signal to set and reset said first flip-flop and thereby produce a delayed input signal, a second flip-flop, and second gate means enabled by pulses of said second timing wave to set said second flip-flop when said input signal and delayed input signal are different, and to reset said second flip-flop when said input signal and delayed input signal are the same, whereby the output of said second flip-flop is a simple non-return-to-zero signal containing the information of said input signal.

6. A code converter utilizing a self-clocking input information signal in which a transition occurs in the middle of a bit cell representing a "1" and a transition occurs between bit cells representing two successive "0's," comprising an oscillator having a period equal to one-half the duration of said bit cells, means responsive to each transition of said input signal to supply a synchronizing pulse to said oscillator, means to derive from the output of said oscillator a first timing wave having pulses occurring during the first one-half of each input bit cell, and a second timing wave having pulses occurring during the second other half of each input bit cell, a first flip-flop, first gate means enabled by pulses of said first timing wave and said input signal to set and reset said first flip-flop and thereby produce a delayed input signal, a second flip-flop, and second gate means enabled by pulses of said second timing wave to set said second flip-flop when said input signal and delayed input signal are different, and to reset said second flip-flop when said input signal and delayed input signal are the same, whereby the output of said second flip-flop is a simple non-return-to-zero signal containing the information of said input signal.

References Cited

UNITED STATES PATENTS 2,937,371 5/1960 Lubkin ------------ 340—347
3,300,578 1/1967 Davis et al.

MAYNARD R. WILBUR, *Primary Examiner.*
M. K. WOLENSKY, *Assistant Examiner.*